United States Patent
Park et al.

(10) Patent No.: US 10,637,541 B2
(45) Date of Patent: Apr. 28, 2020

(54) METHOD AND APPARATUS FOR TRANSMITTING SHORT SSW FRAME IN WIRELESS LAN SYSTEM

(71) Applicant: LG ELECTRONICS INC., Seoul (KR)

(72) Inventors: Sungjin Park, Seoul (KR); Jinmin Kim, Seoul (KR); Hangyu Cho, Seoul (KR); Kyungtae Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/346,094

(22) PCT Filed: Oct. 30, 2017

(86) PCT No.: PCT/KR2017/012052
§ 371 (c)(1),
(2) Date: Apr. 29, 2019

(87) PCT Pub. No.: WO2018/084510
PCT Pub. Date: May 11, 2018

(65) Prior Publication Data
US 2019/0260431 A1   Aug. 22, 2019

Related U.S. Application Data

(60) Provisional application No. 62/416,180, filed on Nov. 2, 2016, provisional application No. 62/418,183, filed (Continued)

(51) Int. Cl.
*H04B 7/04* (2017.01)
*H04B 7/0417* (2017.01)
(Continued)

(52) U.S. Cl.
CPC ............ *H04B 7/0417* (2013.01); *H04L 1/00* (2013.01); *H04L 1/0079* (2013.01); *H04L 1/06* (2013.01);
(Continued)

(58) Field of Classification Search
CPC .................................................... H04B 7/0417
See application file for complete search history.

(56) References Cited

U.S. PATENT DOCUMENTS

2010/0007607 A1 * 1/2010 Li .................. G06F 3/03543
345/163
2016/0105229 A1   4/2016 Trainin et al.
(Continued)

FOREIGN PATENT DOCUMENTS

WO   2018004914   1/2018

OTHER PUBLICATIONS

PCT International Application No. PCT/KR2017/012052, International Search Report dated Feb. 8, 2018, 4 pages.
(Continued)

*Primary Examiner* — Sulaiman Nooristany
(74) *Attorney, Agent, or Firm* — Lee, Hong, Degerman, Kang & Waimey PC

(57) ABSTRACT

According to one embodiment of the present specification, provided is a method by which a station (STA) transmits, through a plurality of channels, signals in a wireless LAN (WLAN) system. The method for transmitting signals comprises the steps of: allowing an STA to transmit a packet for an ISS; allowing the STA to receive a packet for an RSS; allowing the STA to transmit a packet for a SSW feedback; and allowing the STA to receive a packet for an SSW ACK, wherein the packet for the SSW feedback and the packet for
(Continued)

the SSW ACK can include a field for indicating whether the packet for the ISS and the packet for the RSS are transmitted into the short SSW packet.

12 Claims, 23 Drawing Sheets

Related U.S. Application Data on Nov. 6, 2016, provisional application No. 62/444,813, filed on Jan. 11, 2017, provisional application No. 62/444,818, filed on Jan. 11, 2017.

(51) Int. Cl.
*H04L 5/00* (2006.01)
*H04W 72/04* (2009.01)
*H04L 1/00* (2006.01)
*H04L 1/06* (2006.01)
*H04L 27/26* (2006.01)
*H04W 84/12* (2009.01)

(52) U.S. Cl.
CPC ............ *H04L 5/0055* (2013.01); *H04L 27/26* (2013.01); *H04W 72/042* (2013.01); *H04W 72/0453* (2013.01); *H04W 84/12* (2013.01)

(56) References Cited

U.S. PATENT DOCUMENTS

| | | |
|---|---|---|
| 2016/0119043 A1 | 4/2016 | Rajagopal et al. |
| 2016/0190686 A1 | 6/2016 | Gao et al. |
| 2018/0007607 A1* | 1/2018 | Cordeiro .............. H04B 7/0851 |
| 2018/0088225 A1* | 3/2018 | Karls ...................... G01S 13/42 |

OTHER PUBLICATIONS

Eitan, A. et al., "Short SSW Format for 11ay," doc.: IEEE 802.11-16/0416-01-00, Mar. 2016, 11 pages.
Kasher, A., "Beamforming Training proposals," doc.: IEEE 802.11-16/0103r0, Jan. 2016, 15 pages.
Huang, L. et al., "BF Training for SU MIMO," doc.: IEEE 802.11-16/0420r1, Mar. 2016, 12 pages.
European Patent Office Application Serial No. 17867964.3, Search Report dated Sep. 27, 2019, 8 pages.

* cited by examiner

FIG. 9

| CH 1 | L - STF | L - CE | L - Header | ay Header A | ay STF | ay CE | ay Header B | ay payload |
|---|---|---|---|---|---|---|---|---|
| | GF-STF | GF-CE | | | | | | |
| CH 2 | L - STF | L - CE | L - Header | ay Header A | | | | |

(L: legacy, GF: gap filling, ay: 802.11ay)

FIG. 14

Short SSW packet

| Packet Type | Addressing | CDOWN | RF Chain ID | Short SSW Feedback | Direction | Reserved | FCS |
|---|---|---|---|---|---|---|---|
| 2 | 16 | <u>11</u> | <u>2</u> | 11 | 1 | 1 | 4 |

Bits:

FIG. 17

Short SSW packet

| Packet Type | Addressing | CDOWN | RF Chain ID | Short SSW Feedback | Direction | Reserved | FCS |
|---|---|---|---|---|---|---|---|
| 2 | 16 | 11 | 2 | 11 | 1 | 1 | 4 |

Bits:

FIG. 21

| STF | CE | Header | ... | Sector Select | DMG Antenna Select | SNR Report | Poll Required | Reserved | ... | 2nd Sector Select | DMG Antenna Select | SNR Report | 3rd Sector Select | RF Chain ID | SNR Report | 4st Sector Select | RF Chain ID | SNR Report | ... |
|---|---|---|---|---|---|---|---|---|---|---|---|---|---|---|---|---|---|---|---|

Bits: 6 2 8 1 7

METHOD AND APPARATUS FOR TRANSMITTING SHORT SSW FRAME IN WIRELESS LAN SYSTEM

CROSS-REFERENCE TO RELATED APPLICATIONS

This application is the National Stage filing under 35 U.S.C. 371 of International Application No. PCT/KR2017/012052, filed on Oct. 30, 2017, which claims the benefit of U.S. Provisional Application No. 62/416,180, filed on Nov. 2, 2016, 62/418,183, filed on Nov. 6, 2016, 62/444,813, filed on Jan. 11, 2017, and 62/444,818, filed on Jan. 11, 2017, the contents of which are all hereby incorporated by reference herein in their entirety.

BACKGROUND OF THE INVENTION

Field of the Invention

The present disclosure relates to a wireless communication system, and more particularly to a method and device for transmitting a feedback frame and an Ack frame based on a Short sector sweep (SSW) frame.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY OF THE INVENTION

A purpose of the present invention is to provide a method and device for configuring a feedback frame and an acknowledgment (ACK) frame in a wireless communication system when a Short sector sweep (SSW) frame is used in Sector Level Sweep (SLS).

Further, a purpose of the present invention is to provide a method and device for configuring a frame with considering backward compatibility with a legacy system in wireless communication system.

Furthermore, a purpose of the present invention is to provide a method of including, in a frame, corresponding information based on a sector sweep in a wireless communication system.

In one aspect, there is provided a method for transmitting, by a station (STA), a signal on a plurality of channels in a wireless LAN (WLAN) system, the method comprising: transmitting, by the STA, a packet for initiator sector sweep (ISS); receiving, by the STA, a packet for responder sector sweep (RSS); transmitting, by the STA, a packet for SSW feedback; and receiving, by the STA, a packet for SSW ACK, wherein each of the packet for the SSW feedback and the packet for the SSW ACK includes a field including information on whether the packet for the ISS and the packet for the RSS are transmitted based on a Short SSW packet.

In one aspect, there is provided a station (STA) for transmitting a signal on a plurality of channels in a wireless LAN (WLAN) system, the STA comprising: a receiver for receiving a signal; a transmitter for transmitting a signal; and a processor configured for controlling the receiver and the transmitter, wherein the processor is configured for: controlling the transmitter to transmit a packet for initiator sector sweep (ISS); controlling the receiver to receive a packet for responder sector sweep (RSS); controlling the transmitter to transmit a packet for SSW feedback; and controlling the receiver to receive a packet for SSW ACK, wherein each of the packet for the SSW feedback and the packet for the SSW ACK includes a field including information on whether the packet for the ISS and the packet for the RSS are transmitted based on a Short SSW packet.

In one aspect, each of the above method and STA may have following features.

In one embodiment, when the packet for the ISS and the packet for the RSS are transmitted based on the Short SSW packet, a field for identifying each sector is included in the Short SSW packet.

In one embodiment, the field for identifying each sector is a CDOWN field, and the CDOWN field has a length of 11 bits.

In one embodiment, when the packet for the ISS and the packet for the RSS are transmitted based on the Short SSW packet, a field for identifying each sector is included in each of the packet for the SSW feedback and the packet for the SSW ACK.

In one embodiment, the field for identifying each sector is a Short SSW feedback field, and the Short SSW feedback field has a length of 11 bits.

In one embodiment, the field for identifying each sector is a combination of a CDOWN Select 1 field and a CDOWN Select 2 field, wherein the CDOWN Select 1 field has a length of 6 bits, while the CDOWN Select 2 field has a length of 5 bits.

In one embodiment, when the packet for the ISS and the packet for the RSS are transmitted based on the Short SSW packet, each of the packet for the SSW feedback and the packet for the SSW ACK includes a radio frequency (RF) chain ID field.

In one embodiment, when the packet for the ISS and the packet for the RSS are transmitted based on the SSW packet, each of the packet for the SSW feedback and the packet for the SSW ACK includes a 6-bits sector select field and a 2-bits DMG antenna select field.

In one embodiment, the field including information on whether the packet for the ISS and the packet for the RSS are transmitted using or based on the Short SSW packet has a length of 2 bits.

The present invention may provide a method for configuring a feedback frame and an ACK frame in a wireless communication system when a Short SSW frame is used in SLS (Sector Level Sweep).

Further, the present invention may provide a method for configuring a frame with considering backward compatibility with a legacy system in wireless communication system.

Furthermore, the present invention may provide a method of including, in a frame, corresponding information based on a sector sweep in a wireless communication system.

Effects of the present disclosure are not limited to the effects as mentioned above. Other effects not mentioned may be clearly understood by those skilled in the art to which the present invention belongs from following descriptions.

BRIEF DESCRIPTION OF THE DRAWINGS

The accompanying drawings, which are included as a portion of the present disclosure to provide a further understanding of the present invention, provide an embodiment of the present invention and, together with the description, illustrate a technical idea of the present invention.

FIG. 9 is a diagram showing a PPDU structure that can be applied to the present invention.

FIG. 14 shows a short SSW packet.

FIG. 17 shows a short SSW packet.

FIG. 21 shows a method for configuring a frame based on a control trailer.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

Although diverse mobile communication systems applying the present invention may exist, a wireless LAN (WLAN) system will hereinafter be described in detail as an example of such mobile communication system.

1. Wireless LAN (WLAN) System 1-1. General Wireless LAN (WLAN) System

Figure 1:
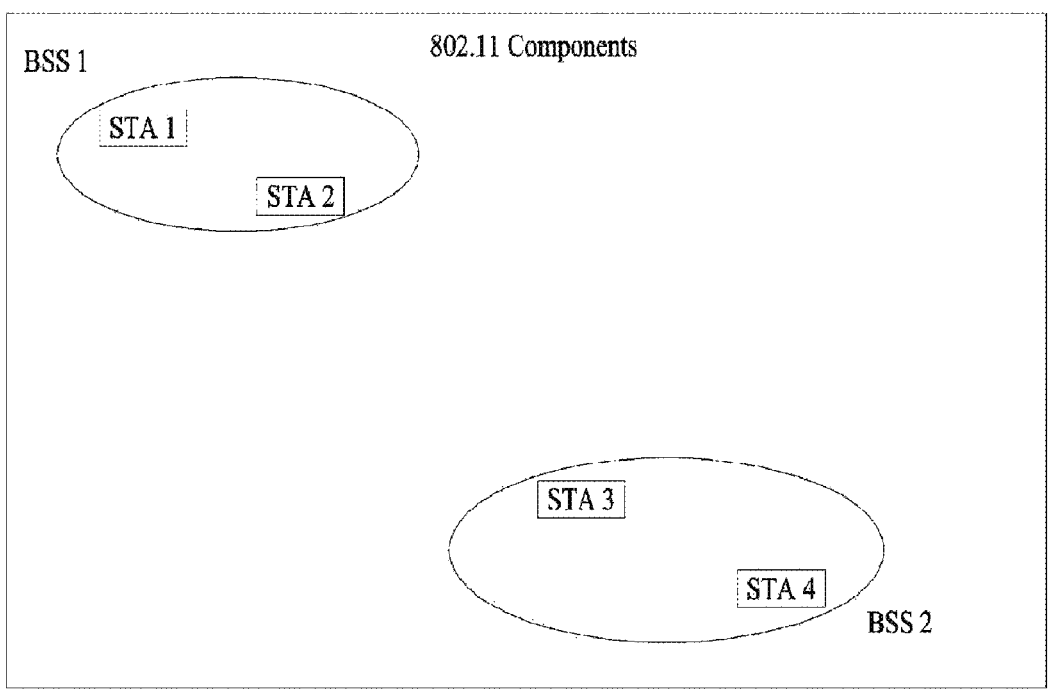
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
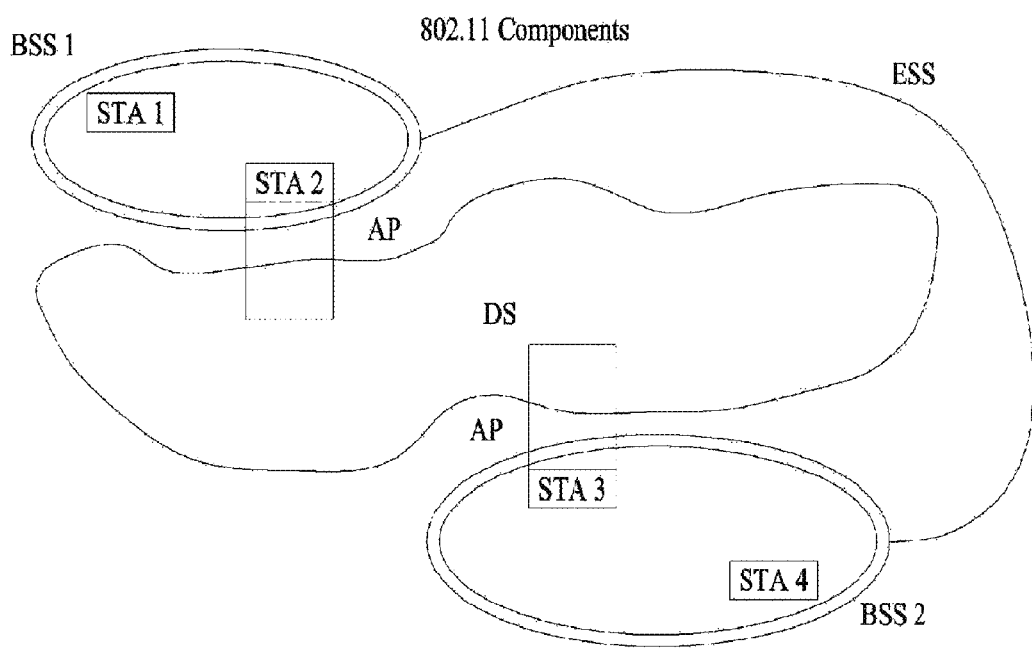
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2 Channel Bonding in a Wireless LAN (WLAN) System

Figure 3:
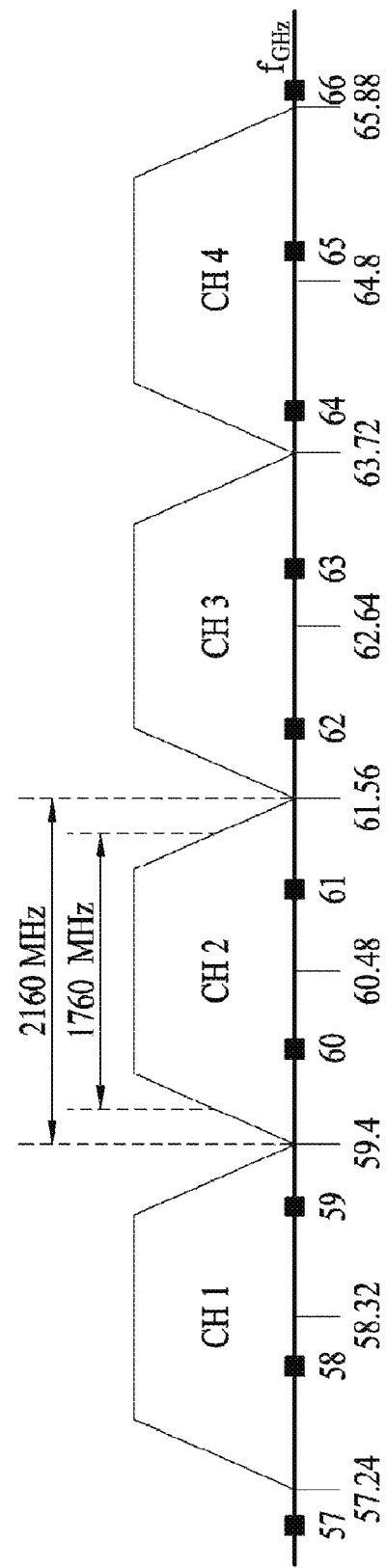
FIG. 3 is a diagram describing a channel in a 60 GHz band for describing a channel bonding operation according to an exemplary embodiment of the present invention.

FIG. 3 is a diagram describing a channel in a 60 GHz band for describing a channel bonding operation according to an exemplary embodiment of the present invention.

As shown in FIG. 3, 4 channels may be configured in a 60 GHz band, and a general channel bandwidth may be equal to 2.16 GHz. An ISM band (57 GHz-66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it shall be understood that diverse channels may be used for channel bonding. And, therefore, the present invention will not be limited to only one or more specific channels.

Figure 4:
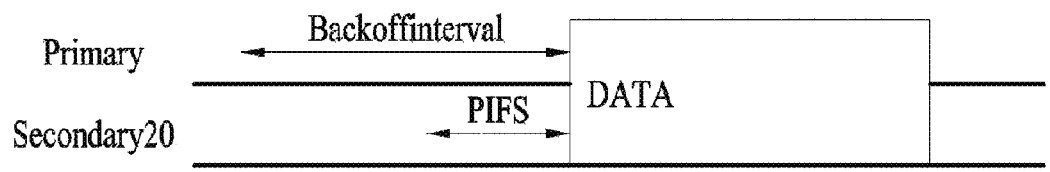
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present invention, a solution (or method) for performing scheduling-based access by having the AP transmit scheduling information to the STAs is proposed. Meanwhile, in another aspect of the present invention, a solution (or method) for performing contention-based channel access based on the above-described scheduling or independently from the above-described scheduling is proposed. Furthermore, in yet another aspect of the present invention, a method for performing communication through a spatial sharing technique based on beamforming is proposed.

1-3. Beacon Interval Configuration

Figure 5:
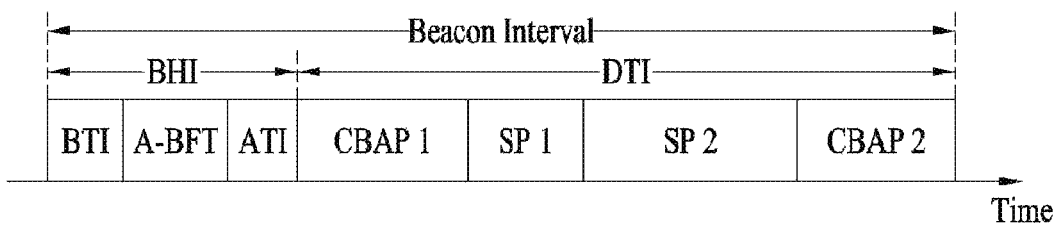
FIG. 5 is a diagram describing a configuration of a beacon interval.

FIG. 5 is a diagram describing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present invention is not necessarily required to be limited only to this.

Hereinafter, a physical layer configuration in a wireless LAN (WLAN) system, in which the present invention is to be applied, will be described in detail.

1-4. Physical Layer Configuration

It will be assumed that the wireless LAN (WLAN) system according to an exemplary embodiment of the present invention may provide 3 different modulations mode as shown below.

TABLE 1

| PHY | MCS | Note |
|---|---|---|
| Control PHY | 0 | |
| Single carrier PHY (SC PHY) | 1 . . . 12 25 . . . 31 | (low power SC PHY) |
| OFDM PHY | 13 . . . 24 | |

Such modulation modes may be used for satisfying different requirements (e.g., high throughput or stability). Depending upon the system, among the modulation modes presented above, only some of the modulation modes may be supported.

Figure 6:
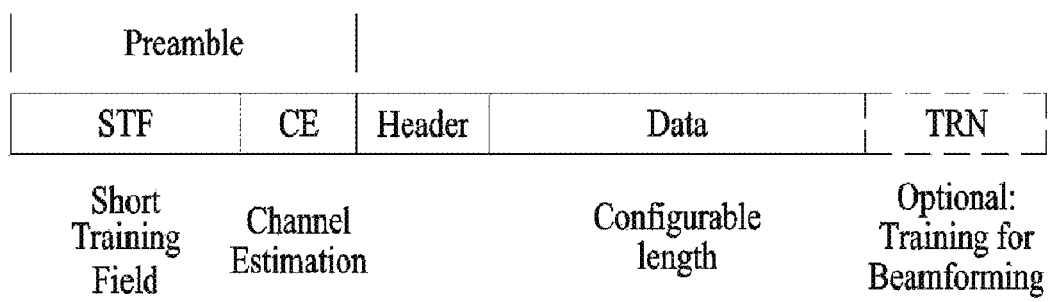
FIG. 6 is a diagram describing a physical configuration of a legacy radio frame.

FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
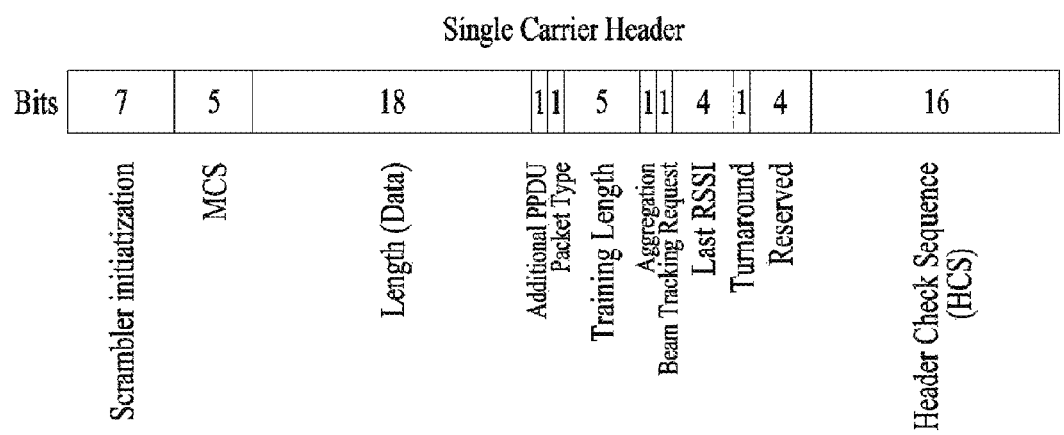
FIG. 7 and FIG. 8 are diagrams describing a configuration of a header field of the radio frame shown in FIG. 6.
Figure 8:
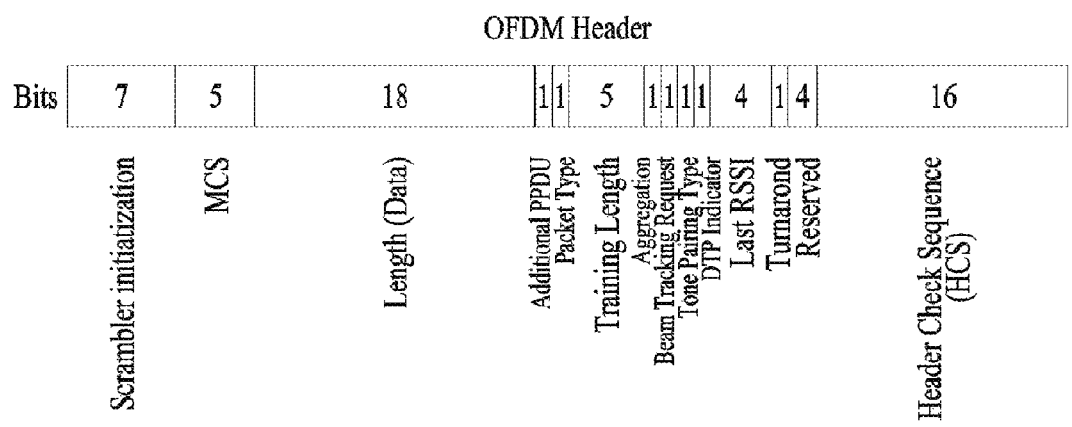

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating (or including information on) an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating (or including information on) an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as in the case of FIG. 7, in the description presented below, such reserved bits may also be used.

As described above, the IEEE 802.11ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using the newly defined field.

FIG. 9 is a diagram showing a PPDU structure according to a preferred embodiment of the present invention. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel And, according to the exemplary embodiment of the present invention, it may be considered to perform the transmission (gap filling) of a new STF and CE field along with the legacy preamble at the same time through the 400 MHz band between each channel.

In this case, as shown in FIG. 9, the PPDU structure according to the present invention has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
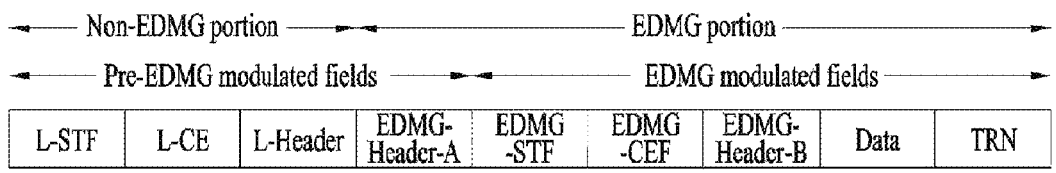
FIG. 10 is a diagram showing a simple PPDU structure that can be applied to the present invention.

FIG. 10 is a diagram showing a simple PPDU structure that can be applied to the present invention. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

2. Beamforming Procedure Applicable to the Present Invention

As described above, in the 11ay system applicable to the present invention, schemes such as channel bonding, channel aggregation, and FDMA, which transmit data using a plurality of channels simultaneously, may be applied. In particular, in the 11ay system applicable to the present invention, a high frequency band signal is utilized, and thus a beamforming operation may be applied to transmit/receive a signal with high reliability.

However, the conventional 11ad system discloses only a beamforming method for one channel but, the conventional 11ad system, there is no suggestion for a beamforming method applicable to multiple channels. In followings, a beamforming procedure for channel bonding or channel aggregation transmission using a plurality of channels is exemplified in detail.

To illustrate the beamforming procedure applicable to the present invention, a beamforming training procedure for one channel is basically illustrated in detail.

Figure 11:
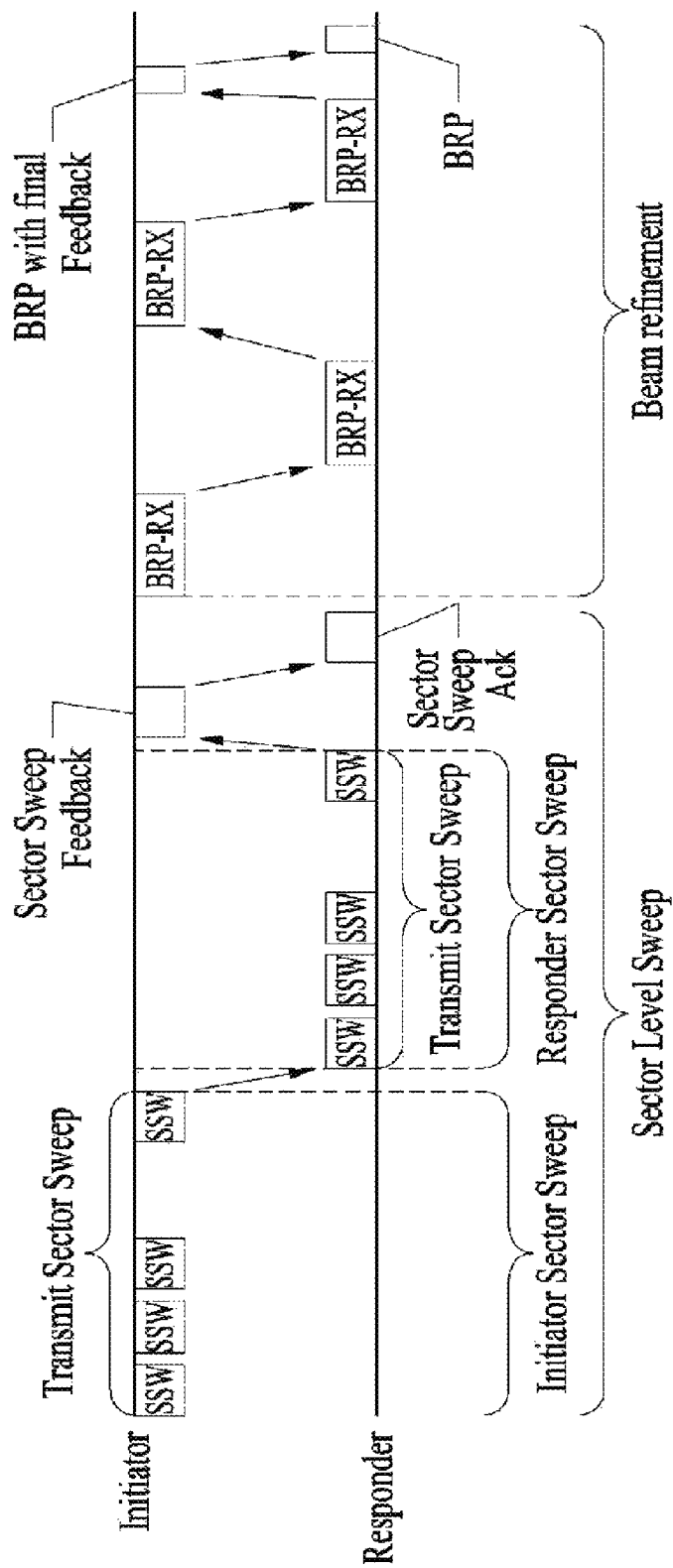
FIG. 11 shows an example of a beamforming training process applicable to the present invention.
Figure 12:
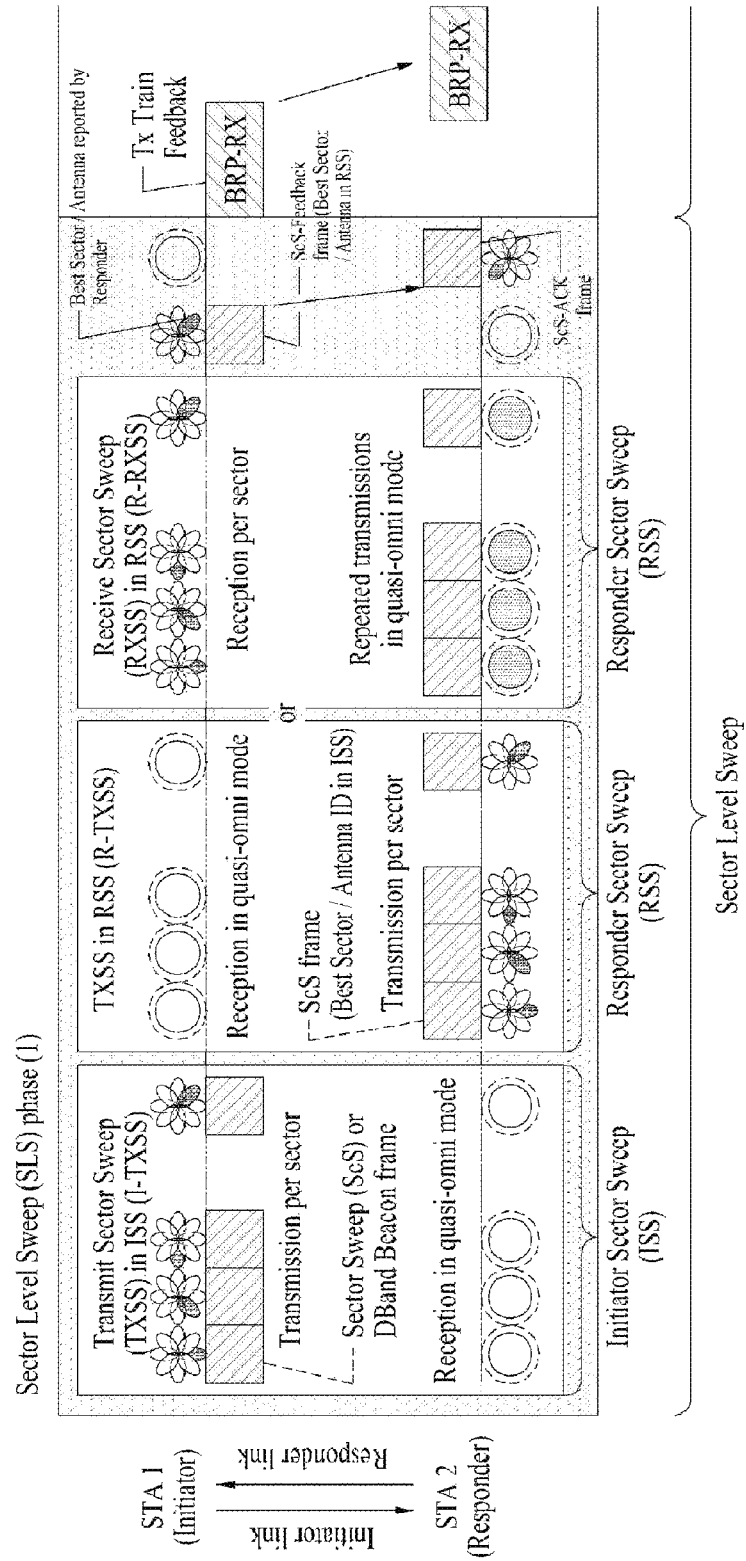
FIG. 12 shows an example of a beamforming training process applicable to the present invention.

FIG. 11 and FIG. 12 show an example of a beamforming training process applicable to the present invention.

Basically, the beamforming procedure applicable to the present invention may be largely composed of a Sector Level Sweep (SLS) phase and a BRP (Beam Refinement Protocol or Beam Refinement Phase) phase. In this connection, the BRP phase may optionally be performed.

Hereinafter, the STA that transmits data through a beamforming operation is called an initiator. The STA that receives data from the initiator is called a responder.

In BF training occurring within A-BFT (Association Beamforming Training) allocation, AP or PCP/AP is the initiator, and non-AP and non-PCP/AP STA is the responder. For BF training occurring within SP allocation, the source (EDMG) STA of the SP is the initiator and the destination STA of the SP becomes the responder. In BF training occurring within TXOP (Transmission Opportunity) allocation, the TXOP holder is the initiator and the TXOP responder is the responder.

The link from the initiator to the responder is called the initiator link, and the link from the responder to the initiator is called the responder link.

In the 60 GHz band supported by the 11-way system applicable to the present invention, a directional transmission scheme may be applied instead of an omni transmission scheme in order to more reliably transmit data and control information.

To this end, STAs that want to transmit/receive data may know the TX or RX best sector for the initiator and responder through the SLS process.

This BF training starts with SLS (Sector Level Sweep) from the initiator. The purpose of the SLS phase is to enable communication between two STAs at the control PHY rate or higher MCS. In particular, the SLS phase only provides transmission of BF training.

In this connection, SLS is a protocol that performs link detection in the 802.11ay system to which the present invention is applicable. The SLS may be a beam training scheme in which the network nodes continuously transmit and receive a frame including the performance information of the receiving channel link while changing only the beam direction, and the nodes select the beam direction with the best indicator/field (e.g., SNR (Signal to Ratio), RSSI (Received Signal Strength Indicator)) indicating/including the best frame among the successfully received frames. This is as described above.

Additionally, if there is a request from the initiator or responder. the SLS may be followed by a BRP (Beam Refinement Protocol or Beam Refinement Phase).

The purpose of the BRP phase is to enable reception training and enable iterative refinement of the AWV (Antenna Weight Vector) of all transmitters and receivers in all STAs. If one of the STAs participating in the beam training chooses to use only one transmission antenna pattern, the receiving training may be performed as a part of the SLS phase.

To illustrate more specifically the SLS phase, the SLS phase may include the following four elements: (Initiator Sector Sweep) to train the initiator link, Responder Sector Sweep (RSS) to train the responder link, Sector Sweep (SSW) feedback, and Sector Sweep (SSW) ACK.

In this connection, the initiator may initiate the SLS phase by transmitting the frame(s) of the ISS. The responder does not start transmission of the RSS's frame(s) before the ISS has been successfully completed. However, there may be an exception if the ISS occurs within the BTI. The initiator may not initiate the SSW feedback before the RSS phase (phase) has been successfully completed. However, there may be an exception if the RSS occurs in the A-BFT. The responder does not initiate the initiator's SSW ACK in the A-BFT. The responder may initiate the initiator's SSW ACK immediately after successful completion of the initiator's SSW feedback.

During the SLS phase, the BF frame transmitted by the initiator may include (EDMG) beacon frame, SSW frame, and SSW feedback frame. During the SLS phase, the BF frame transmitted by the responder may include an SSW frame and an SSW-ACK frame.

When each of the initiator and responder performs TXSS (Transmit Sector Sweep) during the SLS phase, the initiator and responder possesses their own transmit sectors at the end of the SLS phase. When the ISS or RSS employs a receive sector sweep, each of the responder or initiator has its own receive sector. The STA does not change the transmission power during the sector sweep.

In this connection, for example, in the above SLS phase, the initiator and responder may use the Short SSW frame. To this end, the SSW feedback frame and SSW ACK frame may be defined. This will be described later.

Figure 13:
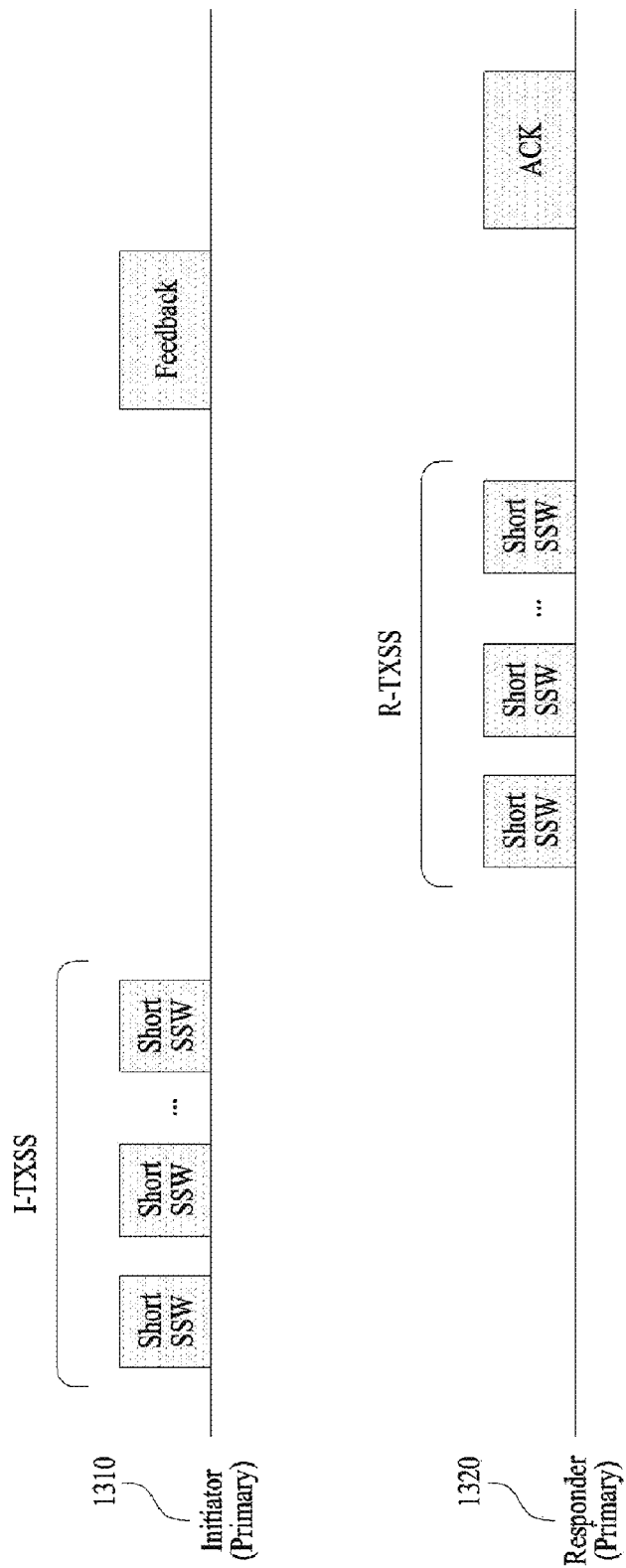
FIG. 13 shows a SLS (Sector Level Sweep) phase.

FIG. 13 shows a method for performing SLS using a Short SSW frame.

Initiator 1310 may perform an I-TXSS (Transmit Sector Sweep) to find the most appropriate beam for transmission, as described above. Further, the responder 1320 may also perform R-TXSS to find the most appropriate beam for transmission, as described above.

In this connection, in one example, the initiator 1310 and responder 1320 may perform I-TXSS and R-TXSS using a Short SSW frame. Further, the initiator 1310 and responder 1320 may use the Short SSW frame in other SLS phase procedures.

However, as shown in FIG. 14, the CDOWN (Countdown) field may be configured with 11 bits in a Short SSW packet (Short SSW packet). Further, the RF (Radio Frequency) chain (chain) ID field may be configured with 2 bits. In this connection, in one example, when performing the sector sweep, the initiator 1310 and the responder 1320 may transmit the SSW packet while incrementing the CDOWN field value of the Short SSW packet by one. That is, beams may be distinguished therebetween using the CDOWN field. Further, the RF chain ID field may be an ID representing the current transmission chain used in the transmission.

Further, as described above, the initiator 1310 may start the SSW feedback when the RSS phase is successfully completed. The responder 1320 may then initiate an SSW ACK upon completion of the SSW feedback, as described above.

Figure 15:
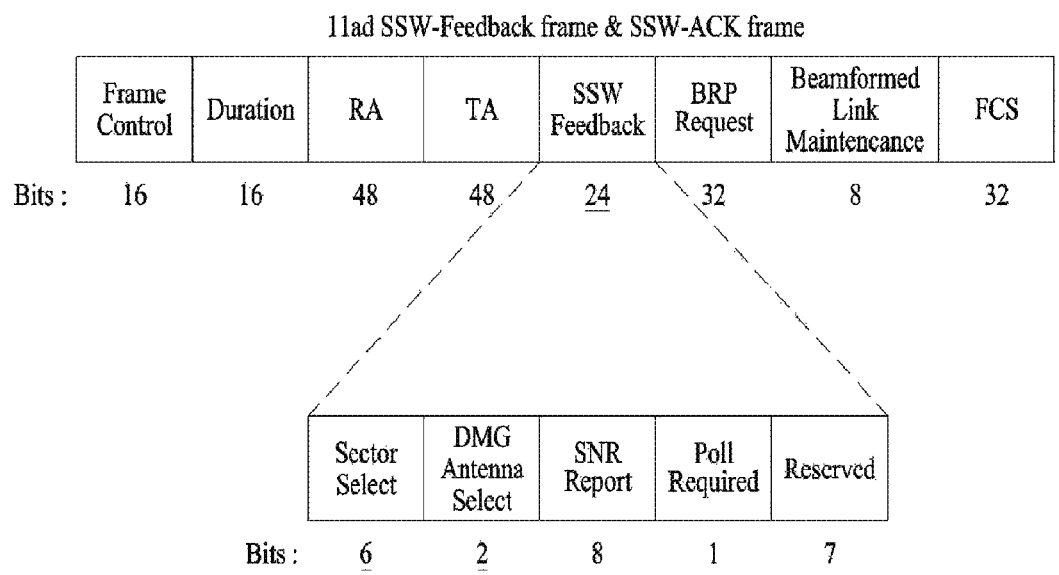
FIG. 15 shows a SSW-Feedback frame and a SSW-ACK frame.

However, referring to FIG. 15, a legacy system uses the frame of FIG. 15 for SSW feedback and SSW ACK. In this connection, referring to FIG. 15, the SSW feedback field may be included in the SSW feedback frame and the SSW ACK frame. However, looking into the SSW feedback field, the sector select field may be 6 bits. In this connection, the SSW feedback and the SSW ACK process, the sector select field may be used to distinguish between beams in the sector sweep procedure as described above. That is, the sector select field may correspond to the CDOWN field as described above.

However, the Short SSW packet is used in the sector sweep procedure (e.g., I-TXSS, R-TXSS) as described above. In this case, since the CDOWN field of the Short SSW packet is 11 bits, the SSW feedback and SSW ACK frame may not supply the feedback and ACK information for each beam. That is, since the sector select field has a smaller number of bits than that of the CDOWN field, the SSW feedback and SSW ACK frame cannot contain both feedback and ACK information.

Further, in one example, when the SSW feedback and SSW ACK re-use the Short SSW packet, transmission opportunities may be wasted because other UEs (e.g., third UEs) reads the CDOWN field and configure the Network Allocation Vector (NAV) for a longer period of time than an actual time. Therefore, when using the Short SSW frame in the SLS phase, there is a need to define corresponding feedback frame and ACK frame.

2-1. Alternative 1

In one example, when using a Short SSW frame in the SLS phase, the corresponding feedback frame and ACK frame may be used as a Short SSW packet.

Figure 16:
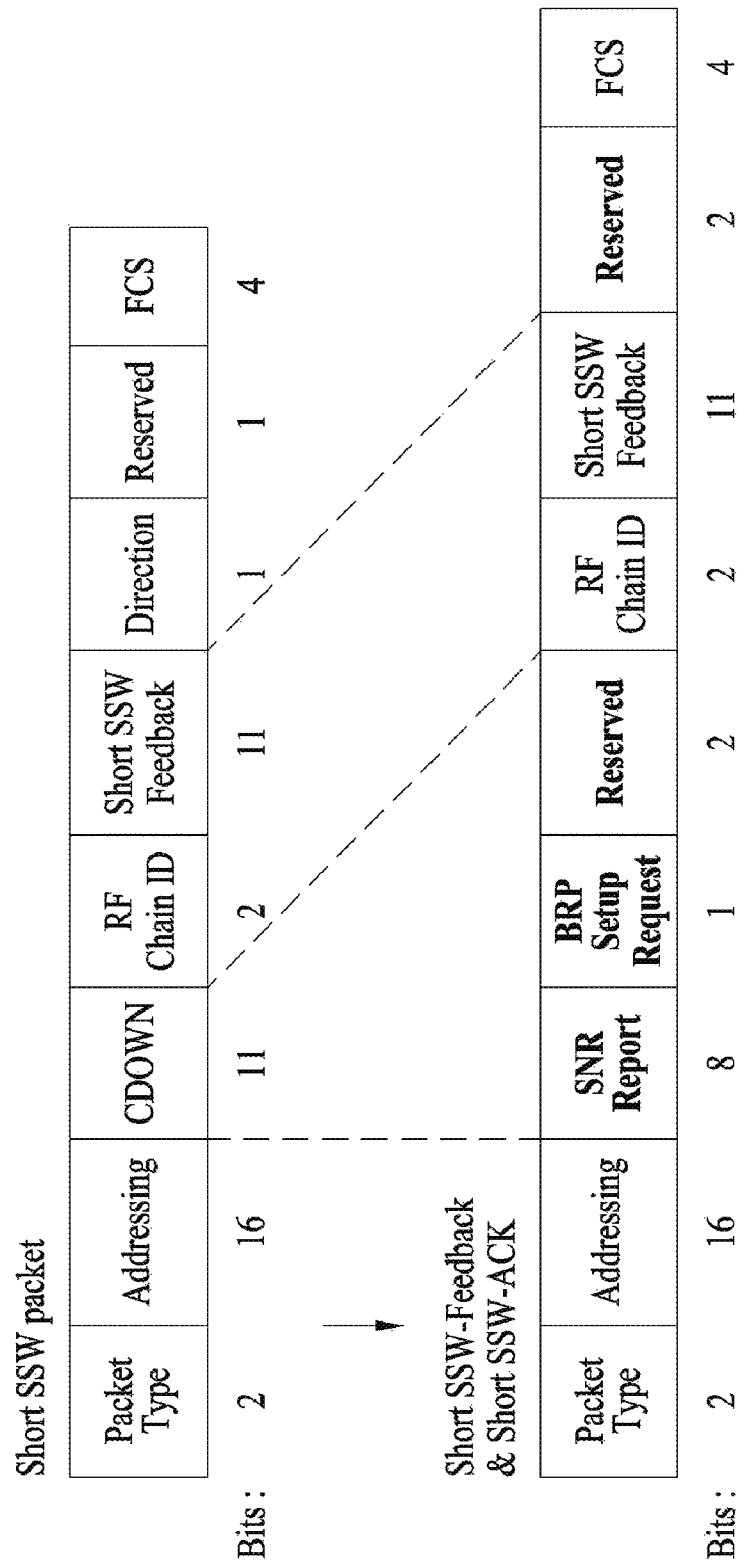
FIG. 16 shows a Short SSW-Feedback frame and a Short SSW-ACK frame based on a Short SSW packet.

More specifically, referring to FIG. 16, a packet type field may be defined in a Short SSW packet. In this connection, the packet type may be 2 bits. In one example, Short SSW, Short SSW-Feedback, and Short SSW-ACK may be indicated using a packet type. In one example, these may be defined as shown in Table 2 below. However, this is only an example, and each indication value may be changed.

TABLE 2

| Packet Type Value | Packet Type |
| --- | --- |
| 0 (00) | Short SSW |
| 1 (01) | short SSW-Feedback |
| 2 (10) | Short SSW-ACK |
| 3 (11) | — |

Further, in one example, when a Short SSW packet is used as Short SSW-Feedback and Short SSW-ACK, the CDOWN field may be configured with an SNR report field, a BRP setup request field, and a reserved field. In this connection, the SNR (Signal Noise Ratio) report field may be a field reporting the SNR as in the legacy system. Further, the BRP (Beam Refinement Protocol or Beam Refinement Phase) setup request field may include information on or indicate whether the BRP setup procedure is performed after the SLS phase. Further, in the Short SSW packet, the Direction field and the legacy reserved field may be configured with reserved bits. In this connection, in one example, the positions of the above-described fields may be changed and are not limited to the above-described embodiment.

In yet another example, the packet type may only include information on or indicate whether the packet is a Short SSW packet or a feedback packet (Short SSW-Feedback or Short SSW-ACK). In this connection, if the packet type indicates or is related to a feedback packet (Short SSW Feedback or Short SSW-ACK), whether the packet is a Short SSW-Feedback or a Short SSW-ACK may be determined using the aforementioned Direction field. That is, a frame type may be indicated using or based on a packet type and a direction field. However, in this connection, the direction field as described above may not be a reserved field.

In another example, referring to FIG. 17, when Short SSW packet is used as Short SSW-Feedback and Short SSW-ACK, the CDOWN field may distinguish between the Short SSW-Feedback and Short SSW-ACK. That is, while the packet type is not separately configured, the CDOWN field may distinguish between the Short SSW-Feedback and Short SSW-ACK. In one example, when the CDOWN field is "1", this indicates or includes information on the Short SSW feedback. When the CDOWN field is "0", this may indicate or including information on the Short SSW-ACK, or vice versa. Further, in one example, the short SSW-feedback and short SSW-ACK may be commonly indicated by designating the direction field as a specific value (e.g., 0). The present invention is not limited to the above-described embodiment.

2-2 Alternative 2

When the short SSW packet is used in the SLS phase, and the feedback and ACK frames use the legacy SSW frames, this cannot provide feedback and ACK for each beam, as described above.

Figure 18:
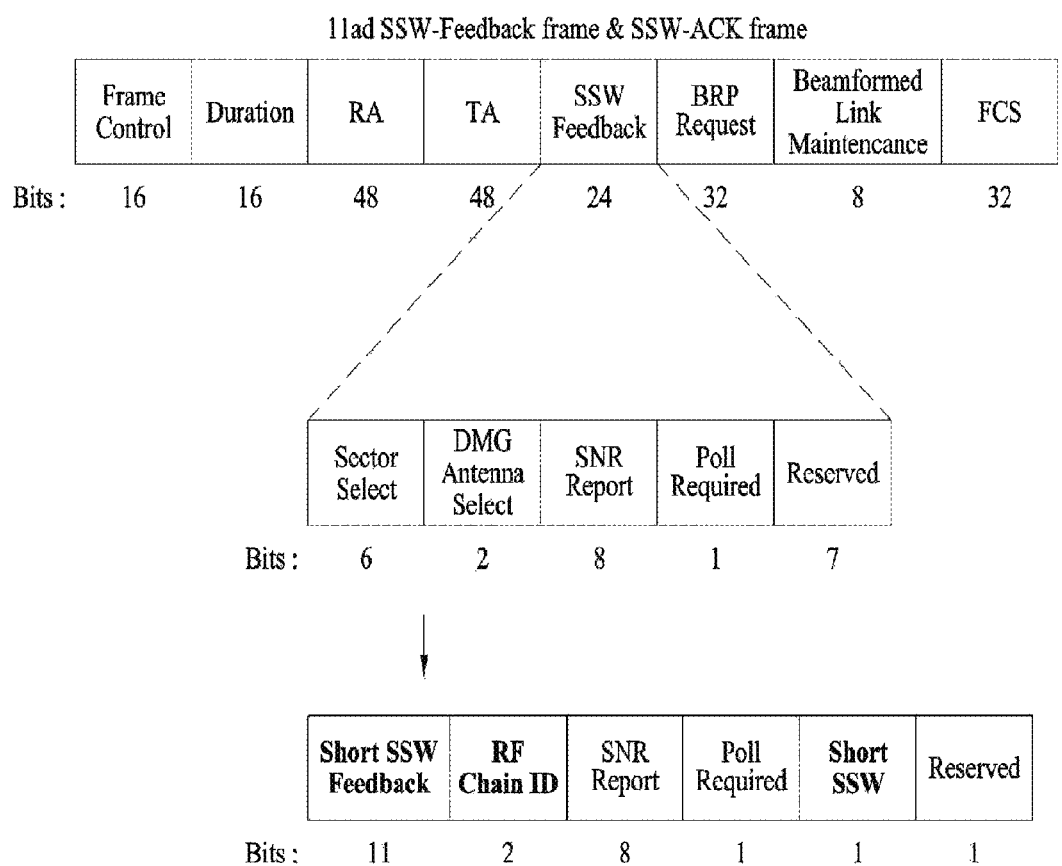
FIG. 18 shows a changed SSW-feedback frame and a changed SSW-ACK frame.

In this connection, referring to FIG. 18, it is possible to change a field so that the legacy SSW-feedback frame and the SSW-ACK frame correspond to the Short SSW. More specifically, when the Short SSW is used in the SLS phase, changed SSW-Feedback frame and SSW-ACK frame may be used. In this connection, the changed SSW-Feedback frame and SSW-ACK frame are not limited to their names Each of the changed SSW-Feedback frame and SSW-ACK frame may have different field configurations from those in the legacy frames.

More specifically, a configuration of the SSW feedback field may be changed in the SSW-feedback frame and the SSW-ACK frame. In this connection, in the current SSW feedback field, a sector select field is 6 bits, and reserved bits may be 7 bits. In this connection, as described above, in the Short SSW, the CDOWN field is 11 bits. Thus, the corresponding field needs to be configured. Further, an ID indicating the RF chain may be required, which may need to be defined.

In another example, the SSW-Feedback frame and the SSW-ACK frame may be used for the legacy system (e.g., IEEE 802.11ad system). Therefore, a field for indicating this use may be required. In this connection, the Short SSW field may include information on or indicate the changed SSW-feedback frame and a changed SSW-ACK frame. In one example, the Short SSW field may be configured with one bit. In this connection, when the Short SSW field value is 0, the SSW-Feedback frame and the SSW-ACK frame format of the legacy system may be used. On the other hand, when the Short SSW field value is 1, the changed SSW-Feedback frame format and the changed SSW-ACK frame format may be used. Further, the short SSW field value may be reversed. The present invention is not limited to the above-described embodiment.

Further, in one example, the Short SSW may be an "EDMG Extension Flag subfield". The changed SSW-Feedback frame and the changed SSW-ACK frame as described above may be a frame format extended for EDMG. That is, there may be a field indicating or including information on whether the changed SSW-Feedback frame and the changed SSW-ACK frame are used. These frames are not limited to names thereof.

In this connection, when looking into the changed SSW-Feedback frame and the changed SSW-ACK frame more concretely, 5 bits among the sector select field and the reserved bits as described above may be configured as Short SSW Feedback. That is, the short SSW feedback may be configured as 11 bits (6 bits+5 bits). Thus, this correspond to the CDOWN field of the Short SSW packet as described above. Further, in the changed SSW-Feedback frame and the changed SSW-ACK frame, the DMG antenna select field may be configured as the RF chain ID field. This may indicate the RF chain. Further, in one example, the position of the above-mentioned field may be variable and is not limited to the above defined position.

Figure 19:
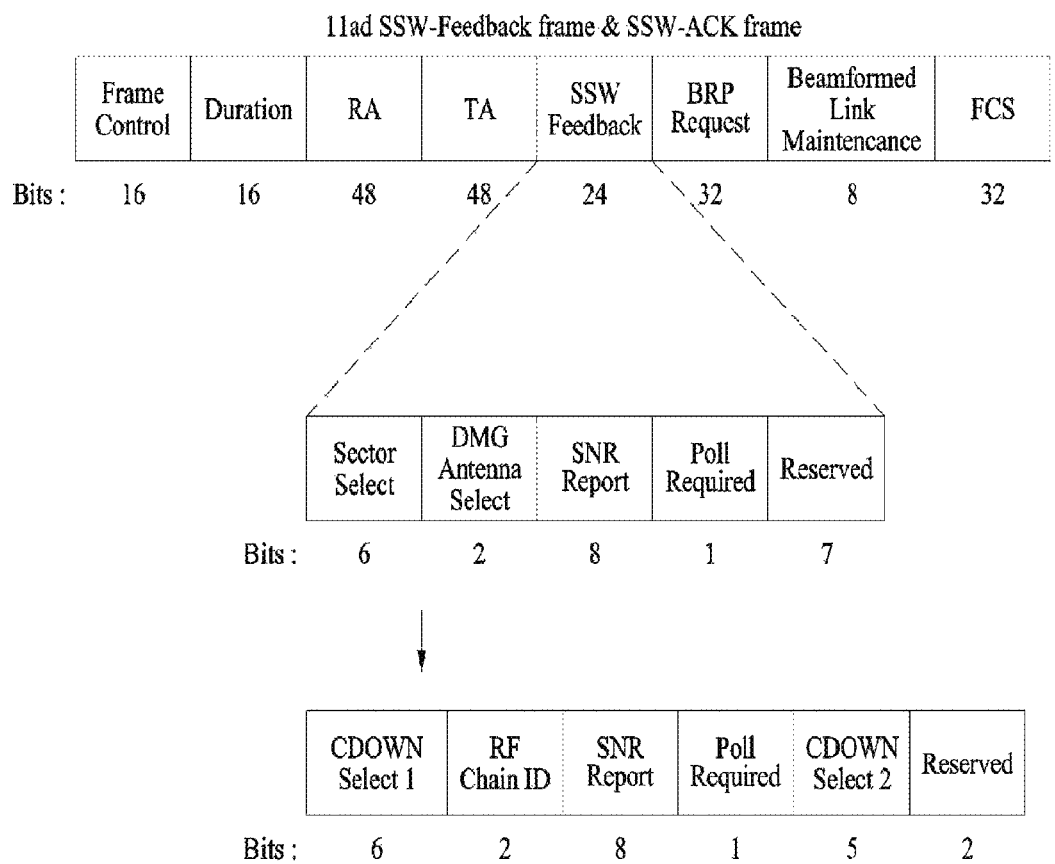
FIG. 19 shows a changed SSW-feedback frame and a changed SSW-ACK frame.

In another example, referring to FIG. 19, the legacy sector select field may be configured with the CDOWN Select 1 field. Further, 5 bits of the reserved bits may be configured as a CDOWN select 2 field. The STA may combine the CDOWN select 1 and CDOWN select 2 fields to include the most optimal CDOWN information for the Short SSW packet. That is, the CDOWN field of the Short SSW packet may correspond to the CDOWN select 1 and CDOWN select 2 fields as described above.

Further, as described above, the SSW-feedback frame and the SSW-ACK frame may be used for the legacy system. Therefore, a Short SSW field for indicating this use may be configured or may be configured to be one bit. In this connection, when the Short SSW field value is 0, the SSW-Feedback frame and the SSW-ACK frame format of the legacy system may be used. On the other hand, if the Short SSW field value is 1, the changed SSW-Feedback frame and the changed SSW-ACK frame format may be used. Further, the Short SSW field value may be reversed. This is as described above.

Further, the DMG antenna select field may be configured as the RF chain ID field. This may indicate the RF chain. Further, in one example, the position of the field as described above may be variable. This is as described above.

2-3. Alternative 3

When the short SSW packet is used in the SLS phase, and feedback and ACK frame use the legacy SSW frame, this cannot provide the feedback and ACK for each beam. This is as described above.

Figure 20:
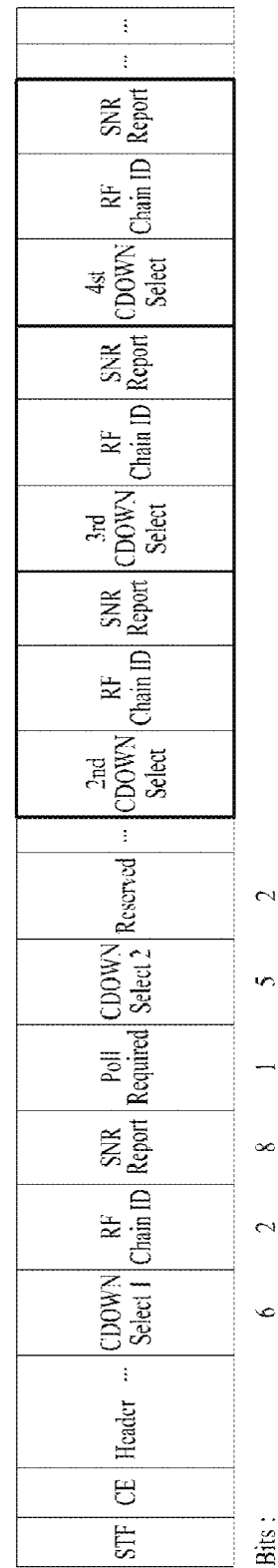
FIG. 20 shows a method for configuring a frame based on a control trailer.

In this connection, referring to FIG. 20, a control trailer may be used to represent the sector ID that was expressed in the Short SSW packet. In this connection, the control trailer may be present in both of the Short-SSW packet (when the packet type is feedback and ACK) and SSW-Feedback and SSW-ACK.

In this connection, in one example, the control trailer may be configured with 11 bits. Further, when the legacy SSW frame is preceded, the control trailer may include at least one of a sector select (Sector Select, 6 bits), a DMG antenna select (DMB Antenna Select, 2 bits) and an SNR report (SNR Report, 8 bits) field. Further, the control trailer may contain a field configured with 2 bits to represent the RF chain ID.

In yet another example, the reserved bits of the control trailer may be used to transmit additional information. In this connection, the additional information may include at least one of information about channel bonding and MIMO (Multi Input Multi Output).

In this connection, the information on channel bonding may include at least one of bandwidth information, information on antenna weight vector (AWV) based on bandwidth, signal interference noise ratio (SINR), and information about whether the next starting BRP is a BRP for channel bonding.

Further, in one example, the information about MIMO may include at least one of the information about the number of streams, the AWV information according to the stream, information about the SINR, and information about whether the next starting BRP is a BRO for MIMO. The present invention is not limited to the above-described embodiments.

More specifically, referring to FIG. 20, when the short SSW frame is used in the SLS, the feedback and ACK frames may be as configured in FIG. 20.

That is, the field corresponding to each sector may be defined using a control trailer. In this connection, as described above, the CDOWN select field, the RF chain field, and the SNR field may be included for each sector. Further, in one example, the number of sectors that can be transmitted based on the control trailer is variable. Information about each sector may be transmitted in a bundle manner, as shown in FIG. 20. Further, in one example, an individual transmission may be realized for each sector. The present invention is not limited to the above-described embodiments.

In this connection, in one example, the number of sectors included in the control trailer may be indicated using reserved bits in the header, or using reserved bits in the SSW Feedback and ACK frame. In this connection, in one example, when the reserved bits are insufficient, one approach may include using the hash function to reduce the number of bits in the RA (Receiver Address) and TA (Transmitter Address) fields of the SSW-Feedback and ACK frames. Thus, an available bit can be secured and an indication can be made using the acquired available bit. In another example, an indication may be made using a control trailer. The present invention is not limited to the above-described embodiments.

In another example, referring to FIG. 21, the control trailer may be added and used even when the SSW frame is used in the SLS phase.

That is, the field corresponding to each sector may be defined using the control trailer. In this connection, as described above, the CDOWN select field, DMG antenna select field, and SNR field may be included for each sector. Further, in one example, the number of sectors that can be transmitted based on the control trailer is variable. Information about each sector may be transmitted in a bundle manner, as shown in FIG. 21. Further, in one example, an individual transmission may be realized for each sector. The present invention is not limited to the above-described embodiments.

In this connection, in one example, the number of sectors included in the control trailer may be indicated using reserved bits in the header, or using reserved bits in the SSW Feedback and ACK frame. In this connection, in one example, when the reserved bits are insufficient, one approach may include using the hash function to reduce the number of bits in the RA (Receiver Address) and TA (Transmitter Address) fields of the SSW-Feedback and ACK frames. Thus, an available bit can be secured and an indication can be made using the acquired available bit. In another example, an indication may be made using a control trailer. The present invention is not limited to the above-described embodiments.

In another example, there is a need to indicate whether the control trailer attached to the SSW-Feedback and ACK is for a Short-SSW frame or an SSW frame. This indication may be achieved using reserved bits in the header, or using reserved bits in the SSW Feedback and ACK frame. In this connection, in one example, when the reserved bits are insufficient, one approach may include using the hash function to reduce the number of bits in the RA (Receiver Address) and TA (Transmitter Address) fields of the SSW-Feedback and ACK frames. Thus, an available bit can be secured and an indication can be made using the acquired available bit. In another example, an indication may be made using a control trailer. The present invention is not limited to the above-described embodiments.

2-4. Alternative 4

In yet another example, feedback and ACK frames may be newly defined. In this connection, in one example, feedback and ACK frames may maintain fields included in the feedback and ACK frames of a legacy system (e.g., IEEE 802.11ad system). Further, additional fields for channel bonding and MIMO (Multi Input Multi Output) may be further defined.

In this connection, the information on channel bonding may include at least one of bandwidth information, information on antenna weight vector (AWV) based on bandwidth, signal interference noise ratio (SINR), and information about whether the next starting BRP is a BRP for channel bonding.

Further, in one example, the information about MIMO may include at least one of the information about the number of streams, the AWV information according to the stream, information about the SINR, and information about whether the next starting BRP is a BRO for MIMO. The present invention is not limited to the above-described embodiments.

Further, in Alternatives 1 to 4 described above, the STA may notify one best sector to neighboring STAs (peer STAs) but also, may simultaneously inform other sectors having a high SNR among the received sectors to neighboring STAs (peer STAs). In this connection, in one example, the number of sectors that may be informed may be configured differently. Further, a bit necessary for informing the number of sectors may be an integral multiple of information about one sector, and is not limited to the above-described embodiment.

Figure 22:
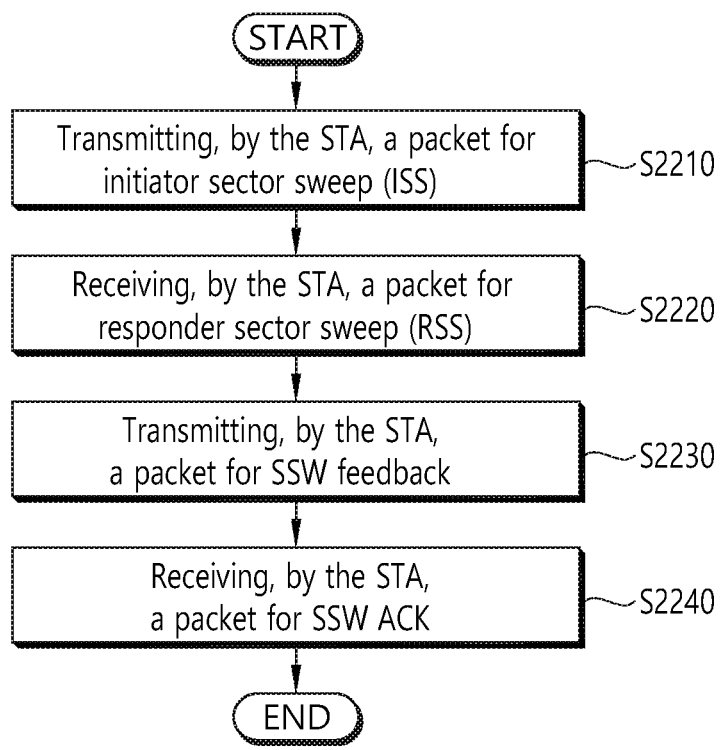
FIG. 22 is a flowchart of a method for transmitting a signal.

FIG. 22 is a flow chart for a method of transmitting a signal.

In this connection, referring to FIG. 22, the STA may transmit a packet about the ISS (S2210). In this connection, as described above in FIG. 1 to FIG. 21, the ISS refers to the phase in which the initiator STA performs the sector sweep. This may be done within the SLS procedure. In this connection, the SLS refers to a protocol that performs link detection in the 802.11ay system applicable to the present invention. The SLS may be a beam training scheme in which the network nodes continuously transmit and receive a frame including the performance information of the receiving channel link while changing only the beam direction, and the nodes select the beam direction with the best indicator (e.g., SNR (Signal to Ratio), RSSI (Received Signal Strength Indicator)) indicating the best frame among the successfully received frames. This is as described above. The initiator STA may also transmit the packet for the ISS. In this connection, the initiator STA may transmit packets while sweeping each sector, as described above.

Next, the initiator STA may receive a packet for the RSS (S2220). In this connection, the RSS may be a process for training the responder STA link, as described in FIG. 1 to FIG. 21. In this connection, the initiator STA may receive, in an omni scheme, the packet transmitted by the responder STA on each sector basis. Further, in one example, the initiator STA may receive a signal transmitted by the responder STA in an omni scheme, while sweeping each sector. However, the present invention is not limited to the above-described embodiment. In this way, an RSS procedure may be performed.

Next, the initiator STA may transmit the SSW feedback packet (S2230). Thereafter, the initiator STA may receive the SSW ACK packet (S2240). In this connection, as described above in FIG. 1 to FIG. 21, the packet for SSW feedback and the packet for SSW ACK may include a field indicating or including information on whether the packet for ISS and packet for RSS are transmitted using or based on the Short SSW packet. More specifically, as described above, the CDOWN field in the Short SSW packet may be 11 bits. In ISS and RSS phases, each sector may correspond to each of the CDOWN fields. Therefore, the field corresponding to the CDOWN field also needs to be included in the SSW feedback packet and the SSW ACK packet. To this end, the packet for the SSW feedback and the packet for the SSW ACK may include a field indicating or including information on whether the packet for the ISS and the packet for the RSS are transmitted using or based on the Short SSW packet. In this connection, a field indicating including information on whether a packet for the ISS and a packet for the RSS are transmitted using or based on the Short SSW packet may be a Short SSW field or may be configured with 2 bits. In another example, when a packet for the ISS and a packet for the RSS are transmitted using or based on the Short SSW packet, the packet for SSW feedback and the packet for SSW ACK may include a field corresponding to each sector. In this connection, the field corresponding to each sector is the Short SSW feedback field. The Short SSW feedback field may be configured with 11 bits. As a result, the field may be configured to correspond to the CDOWN field.

Further, in one example, the field corresponding to each sector may be a CDOWN select 1 (CDOWN Select 1) field and a CDOWN select 2 (CDOWN Select 2) field. In this connection, the CDOWN select 1 field is configured with 6 bits, while the CDOWN select 2 field may be configured with 5 bits. In this connection, a combination of the CDOWN select 1 field and the CDOWN select 2 field may be configured to correspond to the CDOWN field In another example, when a packet for the ISS and a packet for the RSS are transmitted using or based on the Short SSW packet, the packet for the SSW feedback and the packet for the SSW ACK may further include the RF chain ID field, as described above.

On the other hand, a packet for the ISS and a packet for the RSS may be transmitted using or based on the SSW packet. In this connection, the packet for SSW feedback and packet for SSW ACK may be the same packet as in the legacy system. In one example, the packet for the SSW feedback and the packet for the SSW ACK may include a 6-bit sector select field and a 2-bit DMG antenna select field. This is as described above.

3. Device Configuration

Figure 23:
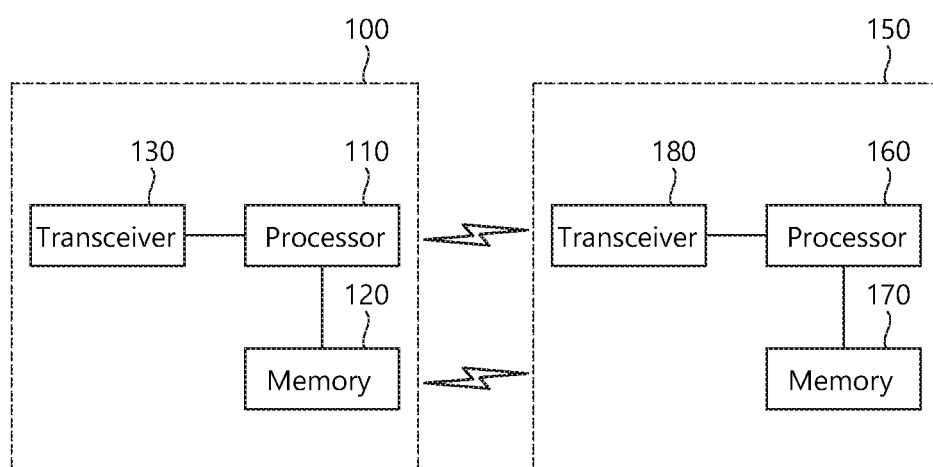
FIG. 23 is a diagram for illustrating a device for implementing the method as described above.

FIG. 23 is a diagram for describing a device for implementing the method as described above.

The wireless device 100 of FIG. 23 may corresponding to the initiator STA for transmission of the signal as described in the above description. The wireless device 150 may correspond to the responder STA for receiving the signal as described in the above-mentioned description. In this connection, each station may correspond to an flay UE or PCP/AP. Hereinafter, for convenience of description, the initiator STA that transmits the signal is referred to as a transmitting device 100, while the responder STA for receiving the signal is called a receiving device 150.

The transmitting device 100 may include the processor 110, the memory 120, the transceiver 130. The receiving device 150 may include the processor 160, the memory 170, and the transceiver 180. The transceivers 130 and 180 transmit/receive wireless signals and may be implemented in a physical layer such as IEEE 802.11/3GPP. The processors 110 and 160 may be implemented in the physical layer and/or the MAC layer and is connected to the transceivers 130 and 180.

The processors 110 and 160 and/or the transceivers 130 and 180 may include application specific integrated circuits (ASICs), other chipsets, logic circuits, and/or data processors. The memories 120 and 170 may include read-only memory (ROM), random access memory (RAM), flash memory, memory card, storage medium, and/or other storage unit. When an embodiment is executed by software, the described method may be executed using a module (e.g., process, function) that performs the described function. The modules may be stored in the memories 120 and 170, and may be executed by the processors 110 and 160. The memory 120, 170 may be located within or outside the processors 110 and 160 or may be coupled to the processors 110 and 160 using well known means.

A detailed description of the preferred embodiments of the present invention as disclosed herein is provided to enable any person skilled in the art to make and use the present invention. Although the above description has been described with reference to the preferred embodiments of the present invention, those skilled in the art will appreciate that various modifications and changes may be made to the present invention from the foregoing description. Accordingly, the present invention is not intended to be limited to the embodiments shown herein but is to be accorded the widest scope consistent with the principles and novel features disclosed herein.

The present invention as described above assumes that the present invention is applied to an IEEE 802.11 based wireless LAN system, but the present invention is not limited thereto. The present invention may be applied to various wireless systems capable of data transmission based on channel bonding in the same manner.

INDUSTRIAL APPLICABILITY

The present invention as described above assumes that the present invention is applied to an IEEE 802.11 based wireless LAN system, but the present invention is not limited thereto. The present invention may be applied to various wireless systems capable of data transmission based on channel bonding in the same manner.

What is claimed is:

1. A method used in a wireless Local Area Network (WLAN) system, the method comprising:
performing, by a station (STA), a sector sweep (SSW) procedure based on a first type SSW packet or a second type SSW packet, wherein the second type SSW packet is a short SSW packet and includes a countdown field having a length of 11 bits, wherein the countdown field is related to a number of sectors related to the SSW procedure;
in response to the SSW procedure, transmitting, by the STA, a first packet for an SSW feedback, wherein the first packet includes a first field including information related to whether the SSW procedure is performed based on the first type SSW packet or the second type SSW packet; and
receiving, by the STA, a second packet for an SSW acknowledgment (ACK), wherein the second packet includes a second field including information related to whether the SSW procedure is performed based on the first type SSW packet or the second type SSW packet,
wherein each of the first packet and the second packet includes a sector select field having a length of 6 bits and a directional multi gigabit (DMG) antenna select field having a length of 2 bits for the SSW procedure being performed based on the first type SSW packet.

2. The method of claim 1, wherein the sector sweep (SSW) procedure is performed based on transmitting a packet for an initiator sector sweep (ISS) and receiving a packet for a responder sector sweep (RSS).

3. The method of claim 1, wherein each of the first field and the second field has a length of 1 bit.

4. The method of claim 1, wherein the second type SSW packet further includes a radio frequency (RF) chain ID field.

5. The method of claim 1, wherein the first field is included in a first feedback field of the first packet, and a length of the first feedback field is 24 bits regardless whether the SSW procedure is performed based on the first type SSW packet or the second type SSW packet.

6. The method of claim 1, wherein the second field is included in a second feedback field of the second packet, and a length of the second feedback field is 24 bits regardless whether the SSW procedure is performed based on the first type SSW packet or the second type SSW packet.

7. A station (STA) in a wireless Local Area Network (WLAN) system, the STA comprising:
a transceiver configured to transmit and/or receive a wireless signal; and
a processor configured to control the transceiver,
wherein the processor is further configured to:
perform, via the transceiver, a sector sweep (SSW) procedure based on a first type SSW packet or a second type SSW packet, wherein the second type SSW packet is a short SSW packet and includes a countdown field having a length of 11 bits, wherein the countdown field is related to a number of sectors related to the SSW procedure;
in response to the SSW procedure, transmit, via the transceiver, a first packet for an SSW feedback, wherein the first packet includes a first field including information related to whether the SSW procedure is performed based on the first type SSW packet or the second type SSW packet; and
receive, via the transceiver, a second packet for an SSW acknowledgment (ACK), wherein the second packet includes a second field including information related to whether the SSW procedure is performed based on the first type SSW packet or the second type SSW packet,
wherein each of the first packet and the second packet includes a sector select field having a length of 6 bits and a directional multi gigabit (DMG) antenna select field having a length of 2 bits for the SSW procedure being performed based on the first type SSW packet.

8. The STA of claim 7, wherein the sector sweep (SSW) procedure is performed based on transmitting a packet for an initiator sector sweep (ISS) and receiving a packet for a responder sector sweep (RSS).

9. The STA of claim 7, wherein each of the first field and the second field has a length of 1 bit.

10. The STA of claim 7, wherein the second type SSW packet further includes a radio frequency (RF) chain ID field.

11. The STA of claim 7, wherein the first field is included in a first feedback field of the first packet, and a length of the first feedback field is 24 bits regardless whether the SSW procedure is performed based on the first type SSW packet or the second type SSW packet.

12. The STA of claim 7, wherein the second field is included in a second feedback field of the second packet, and a length of the second feedback field is 24 bits regardless whether the SSW procedure is performed based on the first type SSW packet or the second type SSW packet.

* * * * *